United States Patent Office 3,786,077
Patented Jan. 15, 1974

3,786,077
PROCESS FOR FORMING MONOCARBOXYLIC ACID
Roger E. Chandler, Westfield, N.J., assignor to Esso Research and Engineering Company
No Drawing. Continuation-in-part of applications Ser. No. 337,187, Jan. 13, 1964, now abandoned, and Ser. No. 657,532, Aug. 1, 1967. This application Oct. 12, 1967, Ser. No. 674,722
Int. Cl. C07c 53/22
U.S. Cl. 260—408                                     5 Claims

ABSTRACT OF THE DISCLOSURE

Process for forming monocarboxylic acid by reaction of halogenated polymer of a $C_2$ to $C_5$ monoolefin with acrylic acid.

PRIOR APPLICATIONS

This application is a continuation-in-part of applications Ser. No. 337,187 filed Jan. 13, 1964, now abandoned and Ser. No. 657,532 filed Aug. 1, 1967, for Roger E. Chandler.

The present invention is concerned with the preparation of high molecular weight monocarboxylic acid by condensing high molecular weight olefin polymer with acrylic acid. The resulting high molecular weight monocarboxylic acid is useful in the preparation of oil-soluble, nitrogen-containing dispersant additives for gasolines, fuel oils, heating oils, lubricating oils, etc. by further reaction with amines to make amides.

Lubricants for modern high compression piston type internal combustion engines are required to have high detergency, efficient sludge dispersing action and high oxidation resistance in order that those engines will be kept free of varnish, sludge and coke-like deposits. Heavy duty detergent type lubricating oil are employed in such engines in order to maintain a high degree of engine cleanliness and thus promote engine life.

In the past, the majority of detergents, sludge dispersants and antioxidant materials that have been developed for use in lubricating oils for internal combustion engines have been metallic derivatives, particularly alkaline earth metal sulfonates, alkaline earth metal salts of alkyl phenol sulfides, colloidal dispersions of metallic carbonates (particularly alkaline earth metal carbonates) and the like. While, in general, additives of these types have proved to be quite satisfactory in their function as sludge dispersants and detergents, in many instances the ash content of these additives has presented a disadvantage in that the ash tends to accumulate in the combustion chamber of the engine and there causes preignition, spark plug fouling, valve burning and similar undesirable conditions. For this reason, an effective dispersant that is ash-free is preferable over an ash-forming detergent additive such as an alkaline earth metal salt of the types mentioned above. Ash-free dispersants are also of advantage in motor fuels, fuel oil compositions and diesel fuels.

It has now been found, in accordance with the present invention, that effective ash-free, mineral-oil-soluble, detergent inhibitors and dispersants can be prepared by condensing a halogenated, high molecular weight, olefin polymer with acrylic acid to form in good yield, a high molecular weight acid having a long aliphatic chain and subsequently reacting the resulting high molecular weight acid directly with a polyalkylene polyamine under conditions causing amide formation. These dispersants can also be prepared by forming an aliphatic alcohol ester of said high molecular weight acid and then condensing the ester with the polyalkylene polyamide.

To prepare the high molecular weight carboxylic acids by the process of this invention, the preferred starting material is a polymer of a $C_2$ to $C_5$ monoolefin, e.g., polyethylene, polypropylene or polyisobutylene, wherein the olefin has an average molecular weight within the range of from 600 to about 3,000. Especially useful acids are obtained when the molecular weight range is about 800 to about 1900. Such polymers have in the range of from about 40 to 250 carbon atoms, and more preferably within the range of about 50 to about 120 carbon atoms, per molecule. The selected polymer is halogenated with either bromine or chlorine, preferably the latter, using sufficient halogen to provide about one to two atoms per molecule of the olefin polymer. The halogenation step may be conducted in the temperature range of from about ordinary ambient temperatures to about 250° F. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 250° F.

The halogenated polymer thus obtained is condensed with acrylic acid. The exact reaction that occurs in the process of the invention between the halogenated olefin polymer and the acrylic acid is not known. However, it is known that a high molecular weight monocarboxylic acid forms in good yield. Attempts to form the high molecular weight monocarboxylic acid by direct reaction with acrylic acid and unhalogenated olefin polymer were unsuccessful. Also attempts to form the high molecular weight monocarboxylic acid by reaction of acrylic acid with a high molecular weight chlorinated saturated hydrocarbon were also unsuccessful. Thus, it appears necessary that the acrylic acid be reacted with a material that is both halogenated, and which also has unsaturation of the type present in monoolefin polymers. In addition, while good yields were obtained with acrylic acid, much lower yields were obtained when the reaction was tried with methacrylic acid and crotonic acid. Also, ethyl acrylate and methyl methacrylate, when reacted with the halogenated olefin polymer, gave considerably lower yields than acrylic acid. It is not known why this difference in yields occurs.

In condensing the halogenated polyolefin with the acrylic acid, at least one mole of acid is used per mole of halogenated polyolefin. Normally, the acid or its ester will be employed in excess and may amount to as much as 1.5 to 2 moles per mole of halogenated polyolefin. The condensation temperature may be in the range of from about 300° to 500° F. and will more preferably be within the range of from about 375° to 475° F. The condensation may require from about 3 to about 24 hours but will ordinarily take place in from 6 to 18 hours.

After the reaction has been completed, excess acid may be purged from the mixture, for example, by blowing with a stream of nitrogen at a temperature of 400° to 500° F.

The high molecular weight carboxylic acid of the invention may also be prepared by a so-called one-step process involving the halogenation of the olefin polymer in the presence of acrylic acid. Using proportions of reactants within the ranges discussed above, the acrylic and the olefin polymer are mixed together in the reactor, the temperature being kept below about 150° F. until the start of halogen introduction so as to avoid homopolymerization of the acrylic acid. Once halogenation has begun, the temperature may be raised to as high as 250° F. After halogen introduction the temperature may be raised to 300° to 50° F. to effect the condensation reaction.

The high molecular weight carboxylic acid can be further reacted with a polyalkylene polyamine under conditions favoring amide formation. Generally, the mole ratio of acid or its ester to polyamine will be in the range of 1:1 to 3:1, although higher ratios, i.e., as high as 5:1, may be employed if there are sufficient amino groups in the polyamine.

The aliphatic polyamine that is employed in preparing the reaction products of the present invention may be an alkylene polyamine fitting the following general formula:

$$NH_2(CH_2)_n-[NH(CH_2)_n]_m-NH_2$$

wherein $n$ is 2 to 3 and $m$ is a number from 0 to 10. Specific compounds coming within the formula include diethylene-triamine, tetraethylenepentamine, dipropylene-triamine, octaethylenenonamine, and tetraethylenepentamine. N,N - di - (2 - aminoethyl) ethylenediamine may also be used. Other aliphatic polyamino compounds that may be used are the N-aminoalkylpiperazines of the formula:

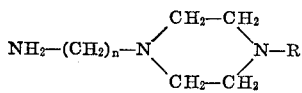

wherein $n$ is a number 1 to 3, and R is hydrogen or an aminoalkyl radical containing 1 to 3 carbon atoms. Specific examples include N-(2-aminoethyl) piperazine, N - (2 - aminoisopropyl) piperazine, and N,N' - di - (2-aminoethyl) piperazine.

The use of mixtures of alkylene polyamines, mixtures of N-aminoalkyl piperazines, and mixtures of the alkylene polyamines with the N-aminoalkyl piperazines is also contemplated, and the term aliphatic polyamine is intended to embrace all of these materials.

The reaction temperatures for amide formation will generally be in the range of from about 200° to 400° F. In most cases, a narrower range of from about 250° to about 350° F. will be used. The reaction time will depend to some extent upon the reaction temperature. The composition of the reaction can be determined by measuring the amount of water or alcohol that is split off during the reaction. If desired, an entraining agent such as heptane can be employed to remove the water or alcohol as an azeotrope.

The invention will be further understood by the following examples:

EXAMPLE 1

(A) Reaction of chlorinated polyisobutylene and acrylic acid

A solution was prepared consisting of 2000 grams of polyisobutylene of 950 molecular weight dissolved in 1000 grams of carbon tetrachloride. Chlorine gas was bubbled through the stirred solution at ambient temperatures for a period of four hours. Following the chlorination step, the carbon tetrachloride solvent was removed from the mixture by purging with nitrogen at 285° F. The chlorinated polyisobutylene had a chlorine content of 4.33%.

A mixture of 600 grams of the chlorinated polyisobutylene thus prepared and 55 grams of acrylic acid was heated to 450° F. over a period of 18 hours. Hydrogen chloride was evolved from the mixture during this heating. The mixture was then purged with nitrogen for one-half hour at 450° F., after which the mixture was cooled to 250° F. and filtered through Dicalite filter aid (diatomaceous earth). The product, identified as polyisobutenyl propionic acid, contained 0.3 wt. percent of chlorine and had a saponification number of 52.1 mg. KOH/gm.

(B) Reaction of chlorinated polyisobutylene and methacrylic acid

A mixture of 710 grams of chlorinated polyisobutylene (chlorine content 6.4%, prepared as in Example 1(A) but using polyisobutylene of 830 molecular weight and a 5-hour chlorine treat) and 88.6 grams of methacrylic acid was heated to 450° F. over a period of about 18 hours. The reaction mixture was purged with nitrogen for one hour to remove excess methacrylic acid. The reaction mixture was cooled to 250° and filtered through Dicalite filter aid. The product had a saponification number of 39.0 mg. KOH/g. showing a 69.6% conversion of the polyisobutylene. The assignment of structure as an acid was confirmed by infrared spectroscopy.

(C) Reaction of chlorinated polyisobutylene and crotonic acid

Chlorinated polybutene (250 grams of a product obtained by chlorinating polyisobutylene of 950 molecular weight and containing 4.18% chlorine) and 27.5 grams of crotonic acid were heated to 450° F. for a total of 20 hours. The product was purged with nitrogen at 450° F. for one-half hour, cooled to 250° and filtered through Dicalite filter aid. The product had a saponification number of 18.3 mg. KOH/g. and was further characterized as an acid by infrared spectroscopy.

EXAMPLE 2

Chlorination of polyisobutylene in presence of acrylic acid

Polyisobutylene (800 g. of a material having a molecular weight of 830) and acrylic acid (80 grams) were heated to 100° F. chlorine was introduced into the reaction mixture at a rate of 400 cc./min. and the temperature was increased to 250° F. The chlorination was terminated after 2 hours and the temperature was raised to 425° F. for 18 hours. The reaction mixture was then purged with nitrogen for one hour at 425° F., cooled to 250° F. and filtered with the aid of Dicalite. The product had a saponification number of 38 mg. KOH/g. The infrared spectrum was identical to the acid prepared by the two-step procedure. The product had a chlorine content of 0.42%.

EXAMPLE 3

(A) Reaction of chlorinated polyisobutylene and acrylic acid

A 110-pound portion of polyisobutylene of 780 molecular weight was heated to 250° F., then a stream of chlorine was passed through the heated polyisobutylene at the 250° F. temperature at a rate of 2.5 pounds of chlorine per hour for a total of 4 hours, the total chlorine treat thus being 10 pounds. A sample of the chlorinated product analyzed 4.3% chlorine and the product had an API gravity of 23.3. To the chlorinated polyisobutylene there was added 10.5 pounds of acrylic acid. Over a period of two hours the temperature was raised from 250° F. to 425° F. and the pressure was increased to 20 p.s.i.g. Heating was continued for 5 hours at 425° F. and the reaction vessel was vented to maintain the pressure of 20 p.s.i.g. The pressure was then released and the mixture was purged with nitrogen for 2 hours to remove unreacted acrylic acid. The polyisobutenyl propionic acid thereby obtained at the end of the reaction weighed 109.3 pounds and had a total neutralization number (ASTM D–664) of 46.2 milligrams of KOH per gram. The chlorine content was found to be 0.3 wt. percent.

(B) Reaction of chlorinated polyisobutylene and ethyl acrylate

An 800-gram portion of polyisobutylene of 950 molecular weight was heated to 200° F. and then treated with a stream of chlorine for 4 hours at that temperature at a chlorine rate of 200 cc. per minute. The temperature was then reduced to 150° F. and 105.6 grams of ethyl acrylate was added. Then the temperature was raised to 425° F. and maintained at that level for 5 hours after which the reaction mixture was stripped with a stream of nitrogen to remove unreacted ethyl acrylate. The product thereby obtained had a saponification number of 34.2 mg. KOH per gram and its infrared spectrum was found to be consistent with an ester of polyisobutenyl propionic acid.

(C) Reaction of chlorinated polyisobutylene and methyl methacrylate

The procedure of Example 3(B) is repeated, but instead of ethyl acrylate the chlorinated polyisobutylene is reacted with 106 grams of methyl methacrylate, yielding an ester product having a saponification number of 40 mg. KOH per gram.

The reaction conditions under which the processes of Examples 1 to 3 were carried out, together with the percent yield of acid obtained, are summarized in Table I which follows:

In Example 3(A), which was carried out at 425° F. for 5 hours, and using substantially equal molar amounts of polyisobutylene and acrylic acid, the percent conversion for the acrylic acid method dropped to 84% as compared to 93% conversion at the higher temperature, longer time and larger molar excess of Example 1(A). Example 3(B) shows that using ethyl acrylate gave only 61% conversion. Example 3(C), using methyl methacrylate, gave 71.4% conversion. Both 3(B) and 3(C) gave significantly less conversion than the 84% conversion of Example 3(A), particularly when considering that Example 3(A) was run with only a very slight molar excess of acrylic acid (.146 mole acrylic per .141 mole of polyisobutylene) which would be expected to give a lesser conversion, than the larger molar excesses of ester in Examples 3(B) and 3(C).

EXAMPLE 4

Preparation of dispersant using the acid prepared by the process of Example 1(A)

A mixture of 355 grams of polyisobutenyl propionic acid prepared as described in Example (1A), 132 grams of a solvent mineral oil (150 SUS viscosity at 100° F.) and 44 grams of tetraethylenepentamine was heated with stirring to 300° F. for 5 hours, during which time the mixture was continuously purged with nitrogen to remove

TABLE I

| | Example | | | | | | |
|---|---|---|---|---|---|---|---|
| | 1(A) | 1(B) | 1(C) | 2 | 3(A) | 3(B) | 3(C) |
| Chlorinated polyisobutylene 950 M.W., g. (moles) | 600(.605) | | 250(.252) | | | | |
| Chlorinated polyisobutylene 830 M.W., g. (moles) | | 710(.800) | | | | | |
| Polyisobutylene 780 M.W., lbs. (moles) | | | | | 110(.141) | | |
| Polyisobutylene 830 M.W., g. (moles) | | | | 800(.962) | | | |
| Polyisobutylene 950 M.W., g. (moles) | | | | | | 800(.843) | 800(.843) |
| Moles Cl | .734 | 1.28 | .295 | | .145 | | |
| Moles polyisobutylene (PIB) | .605 | .800 | .253 | | .141 | .843 | .843 |
| Mole ratio Cl/PIB | 1.21 | 1.60 | 1.155 | | 1.03 | | |
| Wt. percent chlorine in PIB | 4.33 | 6.4 | 4.18 | | 4.3 | | |
| Acrylic acid, wt. g. (moles) | 55(.763) | | | 80(1.11) | 10.5(.146) | | |
| Methacrylic acid g. (moles) | | 88.6(1.03) | | | | | |
| Crotonic acid, g. (moles) | | | 27.5(.319) | | | | |
| Ethyl acrylate, g. (moles) | | | | | | 105(1.05) | |
| Methyl methacrylate, g. (moles) | | | | | | | 106(1.06) |
| Time of condensation, hours | 18 | 18 | 20 | 18 | 5 | 5 | 5 |
| Temp. of condensation, ° F | 450 | 450 | 450 | 425 | 425 | 425 | 425 |
| Wt. percent Cl in final product | .3 | .3 | .3 | .4 | .3 | .3 | .3 |
| Sap. No., mg. KOH/gm | 52.1 | 39.0 | 18.3 | 38. | 46.2 | 34.2 | 40 |
| Percent conversion of PIB | 93 | 69.6 | 32.7 | 67.8 | 84 | 61 | 7.14 |

Comparing the percent conversion of the starting polyisobutylene (PIB) of Examples 1(A) to C, shows the acrylic acid gave a 93% conversion of the polyisobutylene, while methacrylic acid gave a 69.6% conversion and crotonic acid only a 32.7% conversion. While there were some variations in the exact reaction conditions of Examples 1(A) to C, actually these variations further emphasize the surprising difference in yields obtained using acrylic acid as compared to other related acids. Thus, compare 1(A) and 1(B). In Example 1(B), the lower molecular weight of the polyisobutylene, i.e. 820 mol. wt., and the greater molar excess of the methacrylic acid, i.e. 1.03 moles of methacrylic acid per .800 moles of polyisobutylene, would lead one to expect that the yield of converted polyisobutylene obtained in 1(B) would be considerably greater than the yield of 1(A). Yet, the opposite occurred. On the other hand, the reaction conditions of 1(A) and 1(C) were more comparable, yet here the acrylic acid gave a yield more than 2½ times as great as the crotonic acid (93% v. 32.7%) even though the condensation reaction time of Example 1(C) was slightly longer.

Example 2 of Table I shows how the reaction can be carried out in a single step by simultaneous reaction of polyisobutylene, chlorine and acrylic acid. This, as could be expected, results in lower yields of product. Therefore, while the one-step process can be used, the two-step process as illustrated by Example 1(A) of forming the chlorinated polyisobutylene in a first step, and the reacting with acrylic acid in a second step, is preferred.

water formed during the condensation of the acid and the polyamine. The product of the reaction was filtered through Dicalite diatomaceous earth and was found to contain 2.63% nitrogen.

EXAMPLE 5

Using as the base oil a mineral lubricating oil having a viscosity of 325 SSU at 100° F. and a viscosity index of about 100, the following compositions were prepared:

Composition 1: 3.5 wt. percent of a commercial detergent inhibitor, 0.9 wt. percent of a zinc dialkyl dithiophosphate antiwear additive an 95.6 wt. percent of the base oil.

Composition 2: 3.5 wt. percent of the same detergent inhibitor and 0.9 wt. percent of the same antiwear additive as in Composition 1, along with 1.33 wt. percent of the product of Example 4 and 94.27 wt. percent of the base oil.

The commercial detergent inhibitor mentioned above is a mineral oil solution containing an additive prepared by reacting a mixture of a phosphosulfurized polyisobutylene and nonyl phenol with barium hydroxide pentahydrate and blowing the reaction mixture with carbon dioxide. The approximate analysis of the concentrate is 27 wt. percent of phosphosulfurized polyisobutylene, 11.7 wt. percent nonyl phenol, 10.6 wt. percent barium oxide, 2.5 wt. percent carbon dioxide, and 48.2 wt. percent of mineral oil.

The zinc dialkyldithiophosphate antiwear additive was an oil solution consisting of about 25 wt. percent of mineral lubricating oil and about 75 wt. percent of zinc dialkyldithiophosphate prepared by treating a mixture of isobutanol and mixed amyl alcohols with $P_2S_5$ followed by neutralizing with zinc oxide.

Compositions 1 and 2 were each tested for sludge dispersing ability in a Cyclic Temperature Sludge Test which, from prior experience, has been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting five hours, at 1500 r.p.m., and the second cycle lasting two hours, at the same operating speed, with the oil sump and water jacket temperatures being slightly higher in the second cycle than in the first. The two cycles are alternated in sequence until the desired total test time has elapsed. Make-up oil is added as required so as to maintain the oil level in the crankcase at all times between about 3½ and 4 quarts. At the end of selected periods of test time, the engine is inspected by disassembling it sufficiently to permit visual examination of several of the parts, including the rocket arm assembly, the rocker arm cover, the cylinder head, the push rod chamber and its cover, the crankshaft and the oil pan. These parts are visually and quantitatively rated for sludge deposits, using a CRC sludge merit rating system in which a numerical rating of 10 represents a perfectly clean part, and the numerical scale decreases to a minimum value representing a part covered with the maximum amount of sludge possible. The several merit ratings are averaged to give an overall engine merit rating.

The results of the cyclic temperature sludge test when using Compositions 1 and 2 are summarized in Table II:

TABLE II.—SLUDGE MERIT RATINGS-CYCLIC TEMPERATURE TEST

| Test hours | Composition 1 | Composition 2 |
|---|---|---|
| 21 | 9.9 | |
| 42 | 8.6 | 9.94 |
| 63 | 6.9 | 9.94 |
| 84 | 5.8 | 9.85 |

As seen in Table II, Composition 2 containing the amine additive prepared from the high molecular weight monocarboxylic acid of Example 1(A) was superior in preventing sludge deposits than Composition 1 containing prior art lubricating oil detergent. Thus, the preceding results demonstrate the utility of the acids prepared by the process of the invention.

In general, the amine additives prepared from the monocarboxylic acid product of the inventive process can be employed in concentrations ranging from about 0.002 to about 10 wt. percent in oleaginous compositions ranging from gasoline fractions through middle distillate fuels and lubricating oils. For use in lubricating oil usually about 0.1 to about 10 wt. percent, preferably 0.1 to 5 wt. percent of additive will be used in mineral lubricating oils or synthetic oils. About 0.002 to about 2 wt. percent, preferably about 0.005 to about 0.2 wt. percent additive can be added to petroleum distillate fuels boiling in the range of from about 300° to about 900° F., such as No. 1 and No. 2 fuel oils, diesel fuels, and various jet engine fuels. The additives may also be employed, either alone or in combination with other hydrocarbon-soluble additives, in jet fuels and gasolines in concentrations ranging from about 0.001 to 1.0 wt. percent as detergent and/or rust preventive additives.

In either the fuel or lubricant compositions, other conventional additives may also be present, including dyes, pour point depressants, antiwear agents, e.g. tricresyl phosphate, zinc dialkyl dithiophosphates of 3 to 8 carbon atoms, antioxidants such as phenyl-alpha-naphthylamine, tert. octylphenol sulfide, bis-phenols such as 4,4′-methylene bis (2,6-di tert. butylphenol), viscosity index improvers such as polymethacrylates, polyisobutylene, alkyl fumarate-vinyl acetate copolymers, and the like, as well as other dispersants.

What is claimed is:

1. A method of preparing a high molecular weight monocarboxylic acid which comprises condensing about one to two molar proportions of acrylic acid with a molar proportion of a $C_2$ to $C_5$ monoolefin polymer of from 600 to 3000 molecular weight which has been halogenated to provide one to two halogen atoms per molecule of olefin polymer.

2. A method as defined by claim 1 wherein said halogenated polymer is formed by passing halogen gas through a mixture of said acrylic acid and said polymer.

3. A method as defined by claim 1 wherein said polymer is polyisobutylene of 800 to 1900 molecular weight and wherein said halogen is chlorine.

4. A method of forming a high molecular weight monocarboxylic acid which comprises forming a chlorinated polymer by reacting a $C_2$ to $C_5$ monoolefin polymer of from 600 to 3000 molecular weight with chlorine for about 2 to 5 hours at a temperature up to about 250° F. to thereby incorporate in said polymer about one to two molar proportions of Cl per molar proportion of polymer, then mixing one to two molar portions of acrylic acid with each molar portion of said chlorinated polymer, heating at about 300 to 500° F. for about 3 to 24 hours to evolve hydrogen chloride, and recovering high molecular weight monocarboxylic acid.

5. A method according to claim 4, wherein said monoolefin is polybutylene of 800 to 1900 molecular weight and unreacted acrylic acid is removed at the end of the reaction by blowing with inert gas while the reaction mixture is at 400° to 500° F.

References Cited
UNITED STATES PATENTS 3,219,666  11/1965  Norman et al. _____ 260—268
3,364,130  1/1968  Barnum et al. _____ 208—48

ELBERT L. ROBERTS, Primary Examiner

U.S. Cl. X.R.
260—404; 252—51.5